(12) United States Patent
Weeden

(10) Patent No.: US 8,517,793 B2
(45) Date of Patent: Aug. 27, 2013

(54) POLLEN BEE NEST

(76) Inventor: Robert George Weeden, Palgrave (CA)

( * ) Notice: Subject to any disclaimer, the term of this patent is extended or adjusted under 35 U.S.C. 154(b) by 146 days.

(21) Appl. No.: 13/116,057

(22) Filed: May 26, 2011

(65) Prior Publication Data

US 2012/0302131 A1 Nov. 29, 2012

(51) Int. Cl.
*A01K 47/00* (2006.01)
*A01K 47/06* (2006.01)

(52) U.S. Cl.
USPC .................................. 449/4; 449/13

(58) Field of Classification Search
USPC .............................. 449/3, 4, 13, 14
See application file for complete search history.

(56) References Cited

U.S. PATENT DOCUMENTS

| | | |
|---|---|---|
| 1,046,507 A | 12/1912 | Thale |
| 3,468,289 A | 9/1969 | Broida |
| 3,936,894 A | 2/1976 | Barber |
| 4,257,134 A | 3/1981 | Niebur |
| 4,319,371 A | 3/1982 | Wiederrich |
| 4,365,372 A | 12/1982 | Norman |
| 4,628,558 A | 12/1986 | Pederson |
| 4,718,134 A | 1/1988 | Ashby |
| 4,765,007 A | 8/1988 | McCarthy |
| 4,787,108 A | 11/1988 | Norman |
| 4,965,287 A * | 10/1990 | Stendel et al. ............... 514/531 |
| 5,403,226 A | 4/1995 | Trafford |
| 5,618,220 A | 4/1997 | Mills |
| 5,741,170 A * | 4/1998 | Orletsky et al. ................ 449/7 |
| 6,364,738 B1 | 4/2002 | Kendell et al. |
| 7,556,552 B1 | 7/2009 | Kemp et al. |
| 2007/0026765 A1 * | 2/2007 | Renn ............................. 449/2 |

* cited by examiner

*Primary Examiner* — Rob Swiatek
*Assistant Examiner* — Kathleen Iwasaki
(74) *Attorney, Agent, or Firm* — Gifford, Krass, Sprinkle, Anderson & Citkowski, P.C.

(57) ABSTRACT

This invention discloses a bee nest for protecting bees from the environment. The bee nest has desiccating and insulating properties, as well as properties that repulse and deter varrora destructor mites. The bee nest comprises a housing having a first open end and a second open end. The first open end is covered by a first end plate which has ventilation means for the housing. A second end plate encloses the second end. Within the housing, there are a plurality of elongate conduits or tubes. Surrounding the plurality of elongate conduits is filler medium, such as crushed volcanic rock filler. Optionally essential oils to deter mites are distributed on the rock filler.

17 Claims, 5 Drawing Sheets

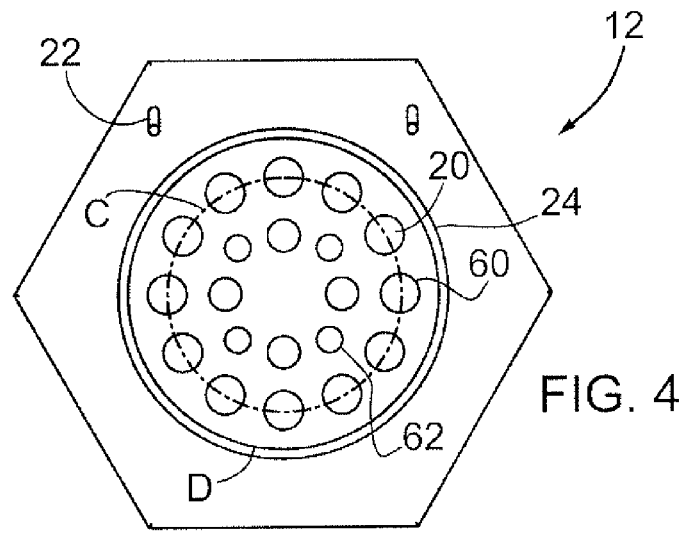
FIG. 4
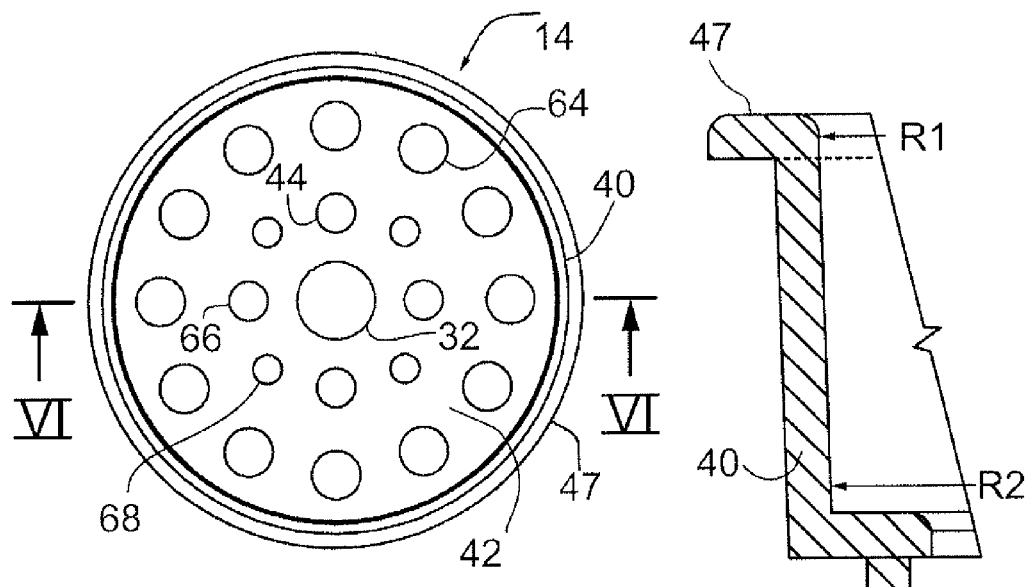
FIG. 5
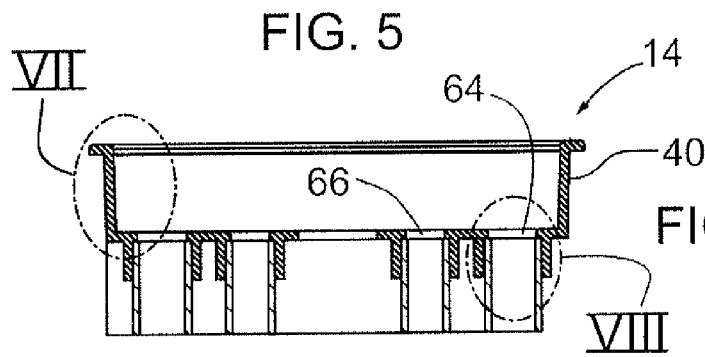
FIG. 6
FIG. 7

POLLEN BEE NEST

FIELD OF THE INVENTION

This invention relates to bee nests. In particular, this invention relates to bee nests for protecting bees and their eggs from undesirable conditions and destruction.

DESCRIPTION OF THE PRIOR ART

It is known for beekeepers and others to use bee nests, hives and containers for rearing, managing, and transporting bees. A variety of types of nests, hives, and transport packaging are known. In particular, it is known to provide special nests intended for use by pollen bees. These nests can be made using paper fibre tubes. Pollen bees can also be described as wild bees or native bees. Generally, the term "pollen bees" includes all bees other than honey bees that help pollinate crops and wild flowers.

For example, U.S. Pat. No. 4,365,372 teaches a bee nest suitable for leaf cutter bees and bumble bees. This nest comprises an assembly of wax paper tubes, such as straws, packed with open ends located at the open front of a container, such as an open waxed paper box. The straws and the box are waxed following packing so as to form a coherent unit. This teaching is limited in that it fails to disclose any means of optimizing the environment for the bee nest.

U.S. Pat. No. 4,787,108 teaches a bee nest intended for single use and made of paper tubes. There are spaces between the tunnels formed by the closely adjacent paper tubes so as to enable air to circulate around the tubes to facilitate the absorption of air and dissipate moisture rapidly.

End plugs for bee shipping tubes are also known. For example, U.S. Pat. No. 4,718,134 teaches an end plug for a bee shipping tube that is perforated with holes to allow air to enter the container, but which are too small for the bees to escape the container.

The use of desiccant at the bottom of a bee shipping container is known from U.S. Pat. No. 3,468,289. This transport package for insects includes an outer container in the form of a cylindrical pail with a circular airtight top. The interior side walls of the containers are covered by a screen, and there is desiccant material at bottom of the container to remove moisture.

There is a need for an improved pollen bee nest that has a desiccant material to reduce the level of moisture in the nest.

There is a further need for a pollen bee nest that has insulating properties to regulate the ambient temperature of bees and their eggs.

There is also a need for a bee nest that repulses and deters varrora destructor mites which can harm bees and their eggs.

SUMMARY OF THE INVENTION

According to one embodiment of the invention, a nesting apparatus for bees comprises an exterior container having opposite first and second end walls and a side wall extending between and connecting the two end walls. The container forms a chamber extending between the two end walls. A plurality of moisture permeable elongate conduits are mounted in the container and are spaced apart from one another. Each conduit has a first open end arranged to allow entry of bees into the conduit and a second closed end. The apparatus also has a desiccant material in the chamber, this material being arranged around and along the elongate conduits and providing heat insulation for bees and bee pulpa in the conduits during use of the apparatus.

In an exemplary version of this nesting apparatus, the desiccant material is crushed volcanic rock and the elongate conduits are paper fibre tubes.

According to another embodiment of the invention, a nesting apparatus for bees comprises an exterior container having two opposite end walls and a side wall extending between and connecting the two end walls. This container forms an enclosed chamber. A plurality of paper fibre bee tubes are mounted in the chamber and are spaced apart from one another to allow air circulation around the bee tubes. A ventilator is mounted in one of the walls of the container and is capable of allowing air to pass into and out of the chamber while filtering out rain water and harmful pests.

In an exemplary version of this nesting apparatus, the ventilator is a removable plug member mounted in a hole in one of the end walls. In addition, crushed volcanic rock is distributed in the chamber in the spaces between the bee tubes and acts as a desiccant.

According to yet another embodiment of the invention, a nesting apparatus for pollen bees comprises an exterior container having two opposite end wall members and a side wall extending between and connecting the two end wall members. The container forms a protective chamber for the bees. The apparatus includes a plurality of bee tubes mounted in the chamber and spaced-apart from one another to allow air circulation around the tubes. The bee tubes extend between and are connected to the end wall members. One of the end wall members is formed with a plurality of open-ended passageways, each receiving in a tight-fitting manner a first end section of a respective one of the bee tubes. Second end sections of the bee tubes remote from the first end sections are closed off.

In an exemplary version of this nesting apparatus, the open-ended passageways are tapered in an outwards direction and the second end sections are closed off by the other of the end wall members.

Other features and aspects of the present invention will become apparent to those skilled in the art upon review of the following description in conjunction with the accompanying drawings of exemplary embodiments.

BRIEF DESCRIPTION OF THE DRAWINGS

Reference will now be made to the following drawings, which show, by way of example, embodiments of the present invention, and in which:

FIG. 4 is a plan view of an end plate member used in the nest of FIG. 1.

FIG. 5 is a plan view of another end plate member used in the nest of FIG. 1.

FIG. 6 is a cross-sectional view of the end plate member, this view taken along the line VI-VI of FIG. 5.

FIG. 7 is a detail view of the circled area VII indicated in FIG. 6.

Similar references in different figures denote similar components.

DETAILED DESCRIPTION OF EXEMPLARY EMBODIMENTS

Figure 1:
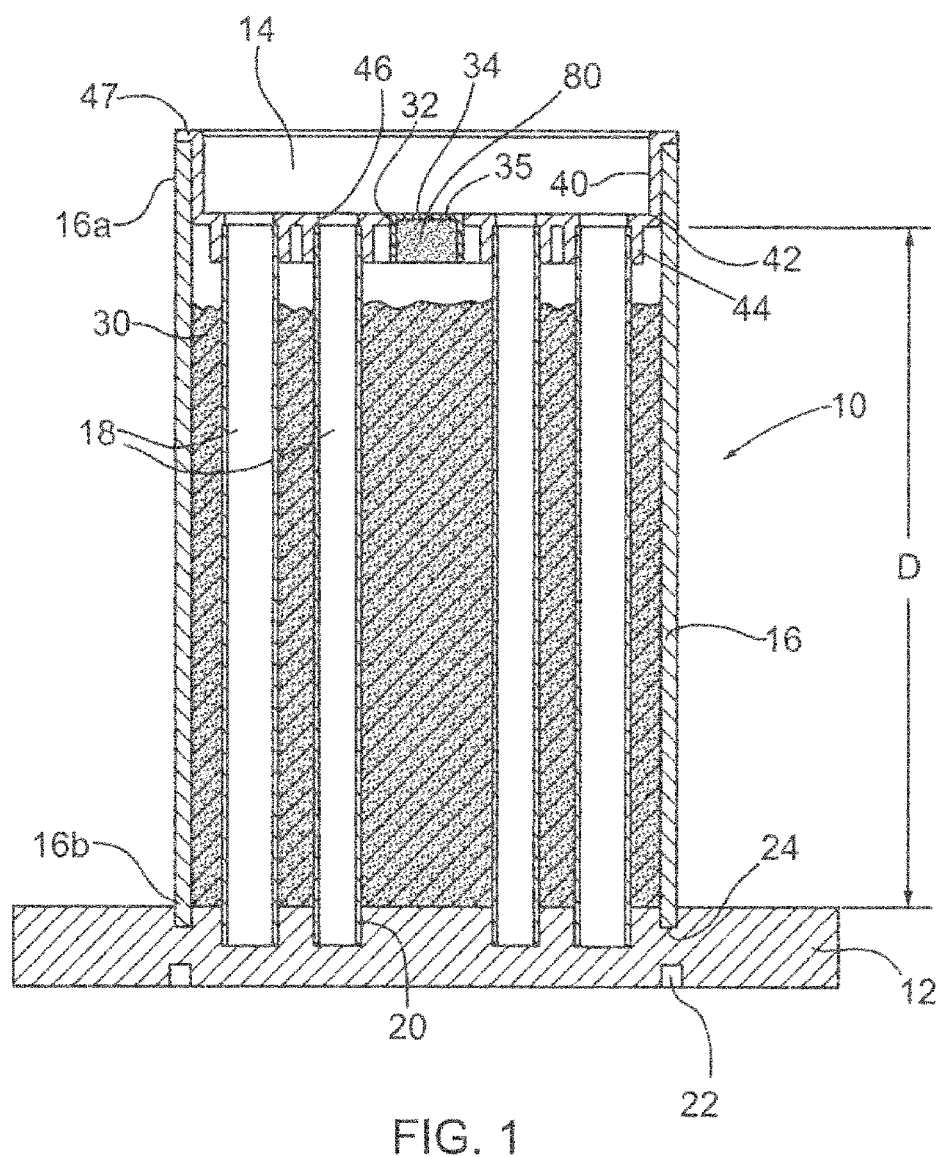
FIG. 1 is a cross-sectional view of the bee nest taken along a longitudinal central axis.
Figure 2:
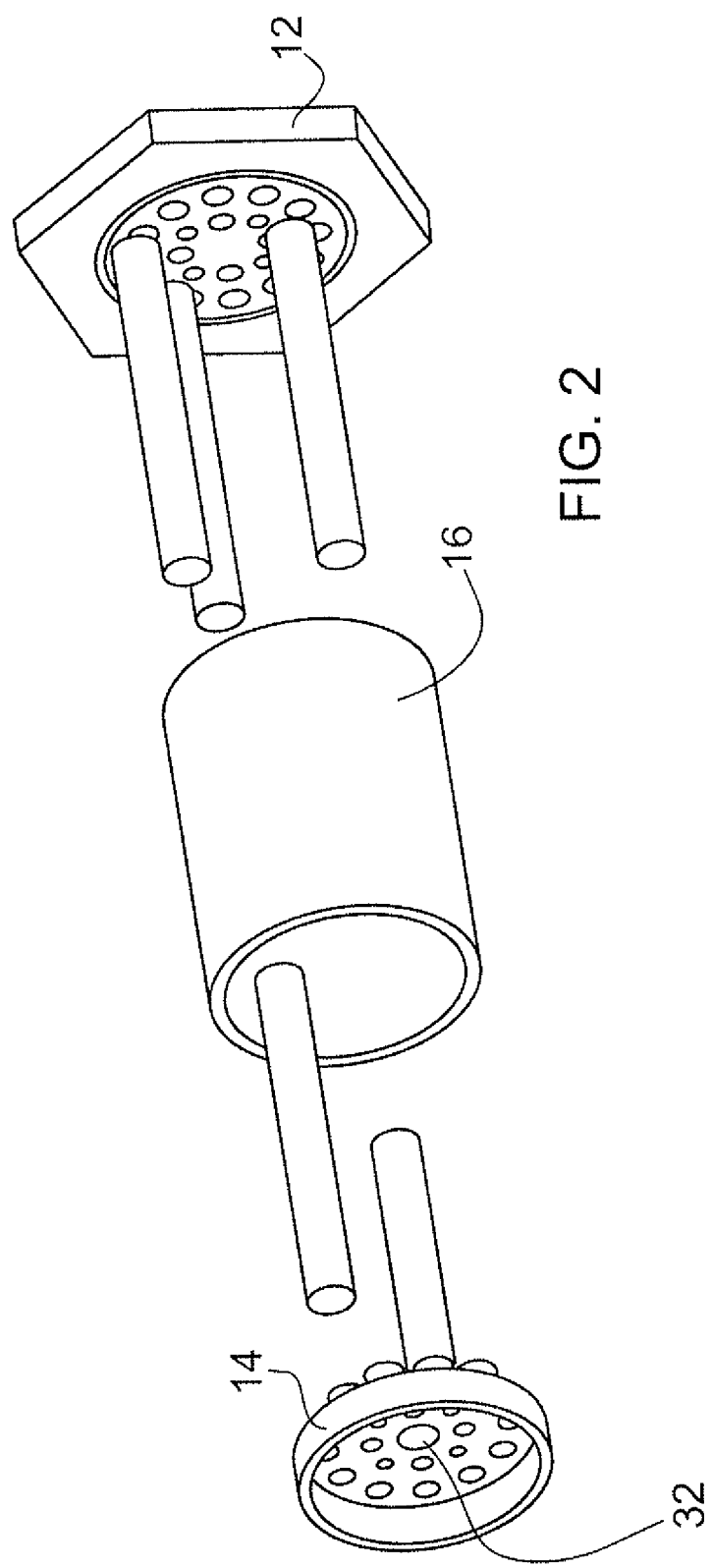
FIG. 2 is an exploded perspective view of the. bee nest with a number of paper tubes omitted for sake of illustration.
Figure 3:
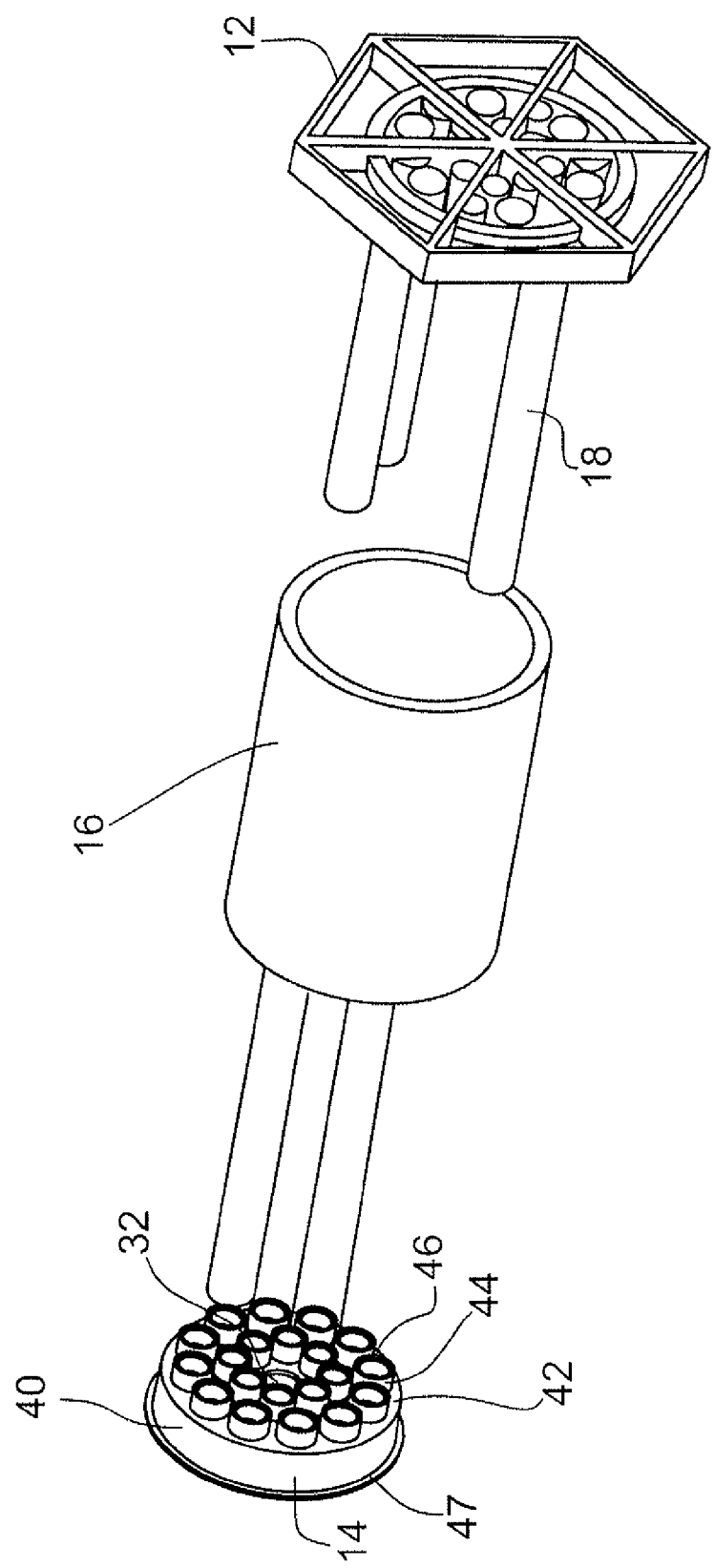
FIG. 3 is another exploded perspective view of the bee nest.

As shown in FIG. 1, the present invention provides a longitudinal cross-sectional view of a bee nest 10. The nest has a tubular housing 16 having a first open end 16a and an opposite second open end 16b. The housing 16 is an exterior container and can take a variety of shapes, such as an elongate rectangle or a cylinder as shown in FIGS. 2 and 3. The housing can be made of waterproof plastic or any other suitable impermeable material. In one exemplary embodiment, the housing 16 is a 3.25 inches O.D. tube×4.25 inches long, but may be of any suitable dimension. The inner diameter of this housing is 3.05 inches. At the first end 16a, there is a first plug or plate 14 that covers the end opening. At the second end 16b, there is a second plate 12 that covers the opposite end opening. The plate 14 can fit snugly within its end opening as shown in FIG. 1. The plate 12 is larger than its end opening as shown and is formed with a circular groove to receive the circular end of the tube. Exemplary versions of both plates 12 and 14 are made of ABS plastic. In one exemplary embodiment, the longitudinal distance D indicated in FIG. 1 is 4.5 inches. Although not shown, the housing 16 may be covered in a patterned appropriately coloured surface to attract bees. Similarly, the first plate 14 and the second plate 12 may be made of a darkly coloured plastic that is preferred by and attracts bees. An exemplary color for the first or front plate 14 and the second plate 12 is dark green.

Within the housing 16 and extending between the first plate 14 and second plate 12, there are a plurality of elongate conduits or tubes 18 in which the bees can nest. The conduits 18 can be made of paper fibre or another material such as a plastic, which is suitable for housing bees, and they have a smooth inside surface. Paper fibre tubes are advantageous because they allow moisture to escape from the tubes and they are relatively low in cost. In FIG. 1, the conduits 18 are partially shown for sake of illustration and it will be understood that they extend to and into the plate 12. While there can be any number of conduits 18, and in FIG. 1 there are four depicted, an exemplary embodiment has twenty conduits in all. Twenty conduits in the nest are considered an optimal number. There should not be an excessive number in order to avoid bee confusion. Different widths of conduits 18 can be used in the same housing 16 so as to house different prevalent species of bees or bees of different sizes. In one embodiment, there are twelve outer tubes or conduits arranged in a circle and these have an O.D. of about 0.375 inch. There are also eight inner tubes arranged in an inner circle and these are of two different outer diameters arranged in an alternating fashion. The larger of these diameters is about 0.313 inch and the smaller is about 0.25 inch. In this embodiment the tubes 18 have a length of 4.25 inches. Each tube. can be a spirally wound paper tube held together by a waterproof adhesive.

Bees nesting in the conduits 18 create a great deal of moisture, which can lead to the undesirable formation of mold. As well, bees are sensitive to changes in temperature and so must be protected from extreme weather conditions while in the conduits. The presence of mites is also undesirable in the conduits 18 so the conduits need to be closed off as well as the space around the conduits to keep mites out. Within the housing 16 and surrounding the conduits or tubes 18, there is a filler medium with both insulating and desiccating properties, such as crushed volcanic rock filler 30. The volcanic rock 30 serves the dual purpose of providing thermal insulation and acting as a desiccant which promotes drying around the conduits 18 by absorbing moisture. Although other desiccants are available for use, volcanic rock has the advantage of being available at a relatively low cost. This volcanic filler is commercially available and has a density of about 5 lbs per cubic foot. The size of the particles in this filler ranges from 1-3 mm. The fine dust found in the filler deters and kills invading insects. Volcanic rock filler also has the advantage of preventing insect predators from chewing through the side of one tube 18 to reach other tubes in the nest.

As shown in FIG. 3, the first plate 14 has a rim 40 circumscribing a support wall 42. The rim 40 and the support wall 42 can be circular or another shape corresponding to the interior shape of the end of the housing. The support wall 42 has a plurality of short conduits 44 forming passageways extending into the housing each sized to receive one end of a respective one of the conduits 18. In order to provide a tight fit around the end sections of the conduits 18, the short conduits 44 are tapered slightly in the outwards direction, that is, towards the support wall 42 and away from the plate or wall 12. Radially inwardly projecting lips 46 (see FIG. 8) extend around the perimeters of the outer ends of the short conduits 44. A radially outwardly projecting lip 47 extends around the outer end of the annual rim 40. Both the lips 46 and the lip 47 help to seal the nest from the entry of moisture and mites. The lips 46 also help prevent the conduits 18 from being pulled out by predators such as rodents and birds.

The second plate 12 includes a plurality of blind holes 20 facing the housing 16, as shown in FIG. 1. The blind holes 20 recede into the second plate 12, vary in size, and are each sized to receive the other end of a respective one of the conduits 18 extending between the second plate 12 and the first plate 14. In an exemplary version of the nest, the blind holes 20 are each tapered to provide a tight fitting with the end section of the respective conduit 18. The second plate can also have the groove 24 to fit the annular edge of the housing 16. The groove may be 0.110 inch wide×0.125 inch deep. The second plate 12 includes slots 22 for facilitating the fastening of the second plate to any desired object, such as a tree, post or wall by the use of standard fastening means (not shown), for example, nails.

Certain exemplary details of the second plate 12 are illustrated in FIG. 4 which shows an outer ring of blind holes 20 as well as an inner ring with fewer blind holes. In one exemplary embodiment of this plate, the twelve outer blind holes have a diameter of 0.375 inch each and a depth of ¼ inch and these holes are centred on a circle indicated at C having a diameter of 2.25 inches. The inner ring of holes comprises four larger holes 60 with a diameter of 0.313 inch each and a depth of ¼ inch and four smaller holes or cavities 62 having a diameter of 0.25 inch each and a depth of ¼ inch. In this particular embodiment, the groove 24 has an inner diameter indicated by the circle at D of 3 inches.

An exemplary form of the first plate 14 is illustrated by FIGS. 5 to 8. This plate also has an outer circle of larger holes or passageways indicated at 64 with the illustrated embodiment having twelve such holes distributed evenly around the plate. The inner circle of holes comprises smaller holes or passageways of two different diameters. The larger of these open-ended passageways are indicated at 66. These alternate with smaller passageways indicated at 68. The diameter of the larger holes 64 in one exemplary embodiment is 0.375 inch while the diameter of the passageways 66 is 0.25 inch. The diameter of the smallest passageways 68 in this embodiment is 0.1875 inch arranged on a circle of 1¼ inch.

FIG. 7 is a detailed view of the annular rim that extends around the first plate 14 and of the aforementioned outwardly projecting lip 47 formed on this rim. An exemplary version of the rim 40 has a slight taper in the downwards direction as seen in FIG. 7. For example, in one exemplary embodiment, the inner diameter of the rim at location R1 is 2.95 inches while the inner diameter of the rim at location R2 is 2.905 inches. This embodiment has a total rim height of ⅝ inch. It will be understood that the taper of the rim facilitates insertion of the first plate into the end of the housing 16.

Figure 8:
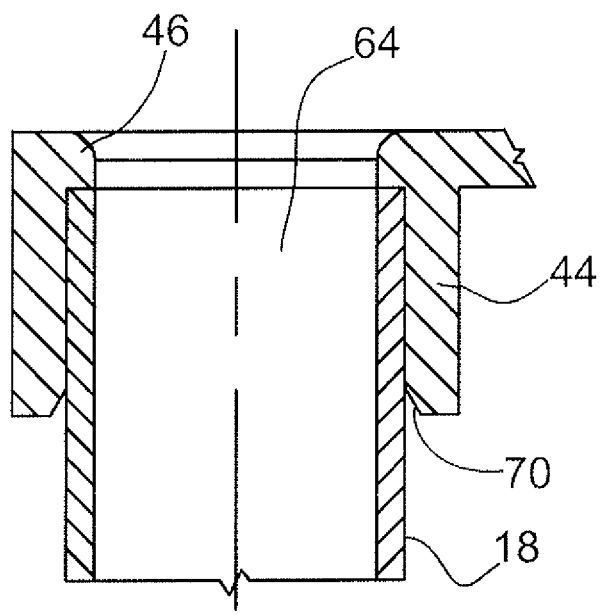
FIG. 8 is a detail view of the circled area VIII indicated in FIG. 6.

FIG. 8 shows in detail an exemplary passageway construction for receiving the upper end of each conduit or tube 18. This figure also illustrates clearly the lip 46 that extends around the passageway or hole 64. The bottom end of the short conduit 44 can be formed with a 30° chamfer at 70. This chamfer together with the slight taper of the conduit 44 facilitates the insertion of the end section of the conduit or tube 18 into the short conduit 44.

Figure 9:
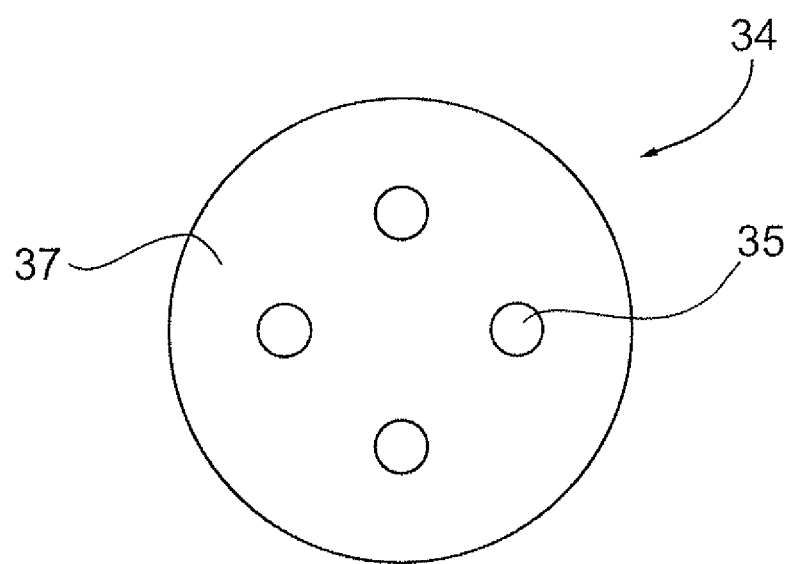
FIG. 9 is a top view of a vent plug used in the bee nest of FIG. 1.

The first plate 14 includes a ventilator which in the illustrated embodiment includes a centrally located circular ventilation aperture 32. Within the aperture 32, there is a plug 34 that acts as a vent to allow air to circulate in the housing 16 and that is shown separately in FIG. 9. The plug 34 is filled with fibreglass 80 which acts to keep out pests while allowing aeration and preventing mold formation. The aperture 32 can be ½" wide in an exemplary embodiment but may be any suitable diameter which allows sufficient aeration. The illustrated hollow plug 34 has four vent holes 35 for aeration. The exterior shell 37 of the plug helps keep rain out of the interior of the container since its exterior surface normally extends vertically during use of the nest. The bottom of the plug is open to allow insertion of the fibreglass which is held by friction fit.

In order to kill pests such as mites that enter the container, a solution of essential oils can be distributed on the rock filler. The amount of essential oil inserted may vary and depends to some extent on the size of the nest. Such essential oils that can be used are marjoram, bergamot, peppermint, lavender, and rosemary in a suspension of light mineral oil. After assembly of the bee nest, 5 c.c. of an essential oil solution containing 2% marjoram, 1% bergamot, 0.5% peppermint, 0.5% lavender, and 1% rosemary in a suspension of light mineral oil can be injected through the ventilation means and into the filler medium. By adding essential oils, such as through injection, into the housing to be mixed with the filler 30, varrora destructor mites can be repulsed and deterred. Varroa destructor is an external parasitic mite that attacks bees. A significant varrora destructor mite infestation can lead to the death of a bee colony. The varroa destructor mite is the parasite with the most pronounced economic impact on the beekeeping industry.

The bee nest can be assembled by the following steps: securing first ends of the plurality of elongate conduits 18 on a first plate; inserting the plurality of elongate conduits through a housing 16; attaching the housing to the first plate; securing the other ends of the elongate conduit on a second plate and attaching the housing to the second plate. In the exemplary method for making the nest, the filler medium 30 is placed in the housing to surround the plurality of elongate conduits for insulating and desiccating the plurality of elongate conduits.

Subsequent steps can further include the injection the essential oil solution in a suspension of light mineral oil into the filler medium for repulsing and deterring varrora destructor mites. For example, the subsequent step can include the injection of 5 c.c. of an essential oil solution containing 2% marjoram, 1% bergamot, 0.5% peppermint, 0.5% lavender, and 1% rosemary in a suspension of light mineral oil into the filler medium for repulsing and deterring varrora destructor mites.

The tubes 18 can easily be replaced when required since they detach easily from the end plate members.

During use of the above described nest, pollen bees will seal the open ends of the tubes 18 with mud and saliva but beetles and mites can attack these seals. Self adhesive disks (not shown) can be supplied with the nest to prevent such insects from invading these seals.

If desired the housing 16 can be wrapped in a colored sheath (not shown) having a pattern in order to make the nest more attractive to bees.

In one exemplary embodiment of the nest, the bee tubes 18 are separated approximately ⅝ inch center to center of adjacent tubes.

Although various embodiments of the present invention have been described herein in detail, it will be appreciated by those skilled in the art that variations may be made thereto without departing from the scope of the invention.

What is claimed is:

1. A nesting apparatus for bees, comprising:
an exterior container having opposite first and second end walls and a side wall extending between and connecting the two end walls, said container forming a chamber extending between said two end walls;
a plurality of moisture permeable elongate conduits mounted in said container and spaced apart from one another, each conduit having a first open end arranged to allow entry of a bee into the conduit and a second closed end; and
an insulating desiccant material in said chamber arranged around and along said elongate conduits, said desiccant material comprising crushed volcanic rock and providing heat insulation for bees and bee pulpa in said conduits during use of the apparatus.

2. A nesting apparatus according to claim 1 wherein said elongate conduits are paper fibre tubes.

3. A nesting apparatus according to claim 2 including a ventilator for providing air ventilation to said chamber, said ventilator also being adapted to keep out rain water and insect pests.

4. A nesting apparatus according to claim 2 wherein the side wall of the container is formed from a waterproof plastic tube having opposite first and second tube ends and said first end wall is detachably connected to said first tube end.

5. A nesting apparatus according to claim 2 wherein an essential oil solution is distributed on said volcanic rock in order to kill mites.

6. A nesting apparatus according to claim 2 wherein said second end wall is formed with a plurality of cavities which have open tops for receiving respective end sections of the conduits and which have closed bottoms which form the closed ends of the conduits.

7. A nesting apparatus according to claim 6 wherein said first end wall is formed with a plurality of short tapered passageways each adapted and sized to receive in a tight fitting manner a first end section of a respective one of the elongate conduits.

8. A nesting apparatus according to claim 1 wherein said first end wall is formed with a plurality of short tapered passageways each adapted and sized to receive in a tight fitting manner a first end section of a respective one of the elongate conduits.

9. A nesting apparatus for bees comprising:
an exterior container having two opposite end walls and a side wall extending between and connecting the two end walls, said container forming an enclosed chamber;
a plurality of paper fibre bee tubes mounted in said chamber and spaced apart from one another to allow air circulation around the bee tubes;

an insulating desiccant material in the form of particulate filler material filling the space between said bee tubes; and a ventilator mounted in one of the walls of the container and capable of allowing air to pass into and out of said chamber while filtering out rain water and preventing penetration of harmful insect pests into the container.

10. A nesting apparatus according to claim 9 wherein said ventilator is a removable plug member mounted in a hole in one of said end walls.

11. A nesting apparatus according to claim 10 wherein said removable plug forms a holding chamber containing fibreglass which prevents said insect penetration into the container.

12. A nesting apparatus according to claim 9 wherein the side wall of the container is a waterproof plastic tube and one of said end walls is formed with a plurality of open ended, tapered passageways each capable of tightly receiving an end section of a respective one of the bee tubes.

13. A nesting apparatus according to claim 12 wherein said end wall has a cylindrical rim with an outer diameter corresponding to an internal diameter of said plastic tube and fitting snugly in an end section of the plastic tube, and wherein an outwardly projecting annular lip extends around an outer end of said rim and engages an adjacent end of the plastic tube in order to close off a joint between the rim and the plastic tube.

14. A nesting apparatus for pollen bees comprising:

an exterior plastic container having two opposite end wall members and a side wall extending between and connecting the two end wall members, said container forming a protective chamber for the bees;

an insulating desiccant material comprising crushed volcanic rock located in said protective chamber;

an essential oil distributed on the volcanic rock; and a plurality of bee tubes constructed of paper fibre mounted in said chamber and spaced apart from one another to allow air circulation around the tubes, said bee tubes extending between and connected to said end wall members and surrounded by the desiccant material;

one of said end wall members being formed with a plurality of open-ended passageways each receiving in a tight fitting manner a first end section of a respective one of the bee tubes, wherein second end sections of the bee tubes remote from the first end sections are closed off.

15. A nesting apparatus according to claim 14 wherein said open-ended passageways are tapered along their lengths in a direction away from the other of the end wall members and the second end sections are closed off by the other of the end wall members.

16. A nesting apparatus according to claim 15 wherein the other end wall member is formed with a plurality of cavities for receiving and holding respective end sections of the bee tubes, said cavities having open tops and closed bottoms.

17. A nesting apparatus according to claim 14 including a filtering and ventilating device in one of the end walls of the container to allow air to circulate between said chamber and the atmosphere outside the container and to filter out rain water and harmful insect pests.

* * * * *